United States Patent [19]

Campbell

[11] 4,018,463
[45] Apr. 19, 1977

[54] PIPE STRESS/STRAIN NEUTRALIZER

[76] Inventor: Joseph K. Campbell, 423 Shannon Way, Tsawwassen, British Columbia, Canada, V4M 2W7

[22] Filed: Apr. 30, 1976

[21] Appl. No.: 682,136

[30] Foreign Application Priority Data

Oct. 7, 1975 Canada .............................. 237201

[52] U.S. Cl. .................. 285/166; 285/95; 285/223; 285/264; 285/334.4; 285/263; 285/DIG. 1

[51] Int. Cl.² ......................................... F16L 27/04

[58] Field of Search ............ 285/DIG. 1, 165, 223, 285/114, 264, 302, 95, 265, 166, 263, 275, 278, 334.4

[56] References Cited

UNITED STATES PATENTS

| | | | |
|---|---|---|---|
| 3,132,479 | 5/1964 | Kuhn .............................. | 285/264 X |
| 3,133,754 | 5/1964 | Peters ............................ | 285/264 X |
| 3,508,769 | 4/1970 | Wulherpfenning ................. | 285/165 |
| 3,889,985 | 6/1975 | Gartmann .......................... | 285/95 |

FOREIGN PATENTS OR APPLICATIONS

| | | | |
|---|---|---|---|
| 249,050 | 1/1964 | Australia ........................... | 285/265 |
| 807,336 | 1/1959 | United Kingdom .............. | 285/223 |

*Primary Examiner*—Dave W. Arola
*Attorney, Agent, or Firm*—Sim & McBurney

[57] ABSTRACT

This invention provides a pipe joint which includes a first pipe end and a second pipe end juxtaposed in substantial alignment. The pipe joint is capable of providing for movement of one pipe end with respect to the other, and also for pressure-compensation. A sleeve member spans between and externally of both pipe ends. Two annular ring structures are positioned between the pipe ends and respective ends of the sleeve member. Sealing surface engagement takes place between each annular ring structure, its respective pipe end, and the sleeve member. Articulating means are provided for interconnecting each annular ring structure with the opposite pipe end, thereby to permit the pressure-compensation.

7 Claims, 5 Drawing Figures

PIPE STRESS/STRAIN NEUTRALIZER

This invention relates generally to pipe couplings and has to do particularly with a pressure-compensated coupling which is adapted to permit relative movement of one pipe end with respect to the other pipe end to which it is coupled. This movement may be in the sense of articulation of the one pipe end with respect to the other about an axis which is normal to both pipe axes, or again may be in the sense of longitudinal (telescoping) movement or rotational movement of the one pipe end with respect to the other about a common axis.

In conventional constructions of pipe couplings which permit some degree of movement of the one pipe end with respect to the other, there has been a constant problem of high cost, primarily relating to the complex structure of the coupling.

An aspect of this invention is to provide a pipe coupling or joint which is simple in construction, readily assembled and capable of permitting one or more kinds of movement of the one pipe end with respect to the other.

Accordingly, this invention provides a pipe joint comprising: a first pipe end and a second pipe end juxtaposed in substantial alignment, each pipe end defining an outer sealing surface, a sleeve member spanning between and externally of both pipe ends and defining two inner sealing surfaces laterally aligned with the outer sealing surfaces of the pipe ends, a first annular ring member having an inner sealing surface for sliding engagement with the outer sealing surface of said first pipe end, and having an outer sealing surface for sliding engagement with one of the inner sealing surfaces on said sleeve member, a second annular ring member having an inner sealing surface for sliding engagement with the outer sealing surface of the second pipe end, and having an outer sealing surface for sliding engagement with the other of the inner sealing surfaces on said sleeve member, first articulating means connecting said first annular ring member to said second pipe end, and second articulating means connecting said second annular ring member to said first pipe end.

Three embodiments of this invention are shown on the accompanying drawings, in which like numerals denote like parts throughout the several views, and in which.

Figure 1:
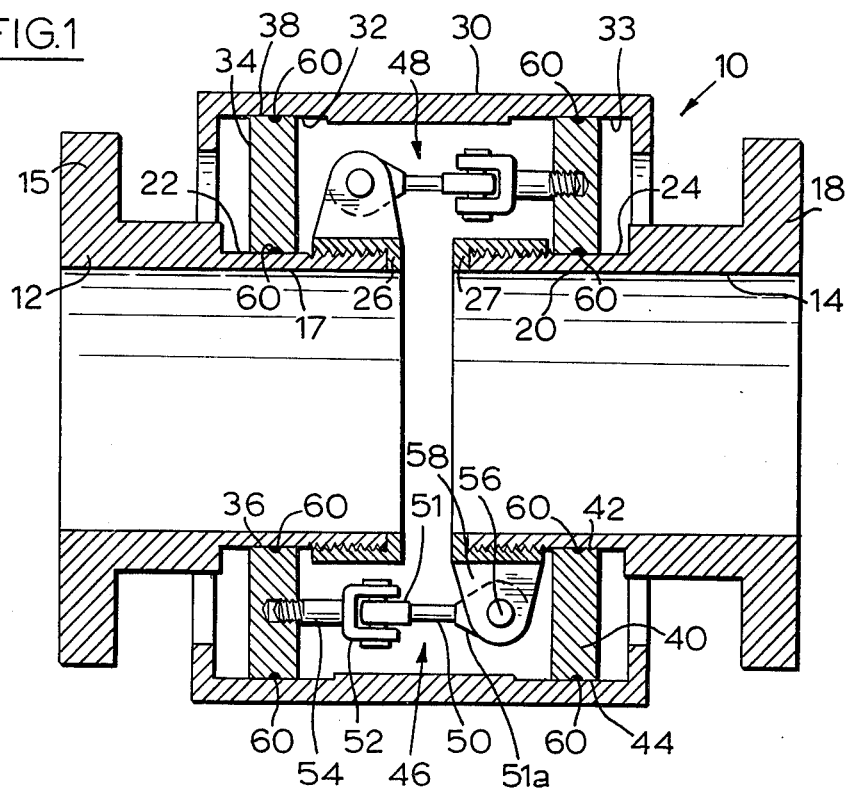
FIG. 1 is an axial sectional view of the first embodiment of this invention.

Attention is first directed to FIG. 1, in which a pipe coupling shown generally at 10 includes a first flange member 12 and a second flange member 14. The first flange member 12 includes a flange 15 and an inner end which shall be called for the purposes of the following discussion a first pipe end 17. The inner portion of the first flange member 12 is referred to as a first pipe end because it is the equivalent of the end of an actual length of pipe, and could theoretically be the end of a length of pipe. Practical considerations, however, make it desirable to provide the flange 15 in order to permit connection to and disconnection from a length of flanged pipe. Alternatively, the member 12 could be supplied with weld ends, Likewise, the second flange member 14 includes a flange 18 and a second pipe end 20. As can be seen in FIG. 1, the first pipe end and the second pipe end are juxtaposed in substantial alignment in the first embodiment of this invention.

The first pipe end 17 defines a first outer cylindrical sealing surface 22, and the second pipe end 20 defines a second outer cylindrical sealing surface 24.

The inner ends of the pipe ends 17 and 20 are externally threaded and receive thereon respective threaded collars 26 and 27.

A sleeve member 30 spans between and externally of both of the pipe ends 17 and 20, and is constructed to define two inner cylindrical sealing surfaces 32 and 33, laterally aligned with the outer cylindrical sealing surfaces 22 and 24 respectively.

A first annular ring member 34 is provided with an inner cylindrical sealing surface 36 in sliding engagement with the outer sealing surface 22 of the first pipe end 17, and has an outer cylindrical sealing surface 38 in sliding engagement with the inner cylindrical sealing surface 32 of the sleeve member 30.

A second annular ring member 40 is also provided, having an inner cylindrical sealing surface 42 in sliding engagement with the second outer cylindrical sealing surface 24 of the second pipe end 20, and having an outer cylindrical seal-surface 44 in sliding engagement with the inner cylindrical sealing surface 33 of the sleeve member 30.

A first articulating means a portion of which is shown at 46 in FIG. 1 is provided for connecting the first annular ring member 34 to the threaded collar 27, in turn connected to the second pipe end 20. Second articulating means a portion of which is shown generally at 48 in FIG. 1 is provided for connecting the second annular ring member 40 to the threaded collar 26, in turn connected to the first pipe end 17.

The articulating means 46 and 48 are such as to permit some degree of rotational movement of the one pipe end with respect to the other about their common axis. More particularly, the first articulating means 46 includes a plurality of connecting spans of which only one is visible at the bottom in FIG. 1, the different spans being located at radially separated positions around the pipe joint. Each connected span includes a connecting link 50, having a spherical rod end 51 at one end, and a spherical rod end 51 (a) at the other. The rod end 51 includes a clevis 52 which is rigidly supported on the end of a shank 54 which is threadably engaged with the first annular ring member 34. The rod end 51 (a) includes shaft 56 supported between radially outwardly projecting flanges 58 (only one of the flanges 58 being visible in FIG. 1), which in turn extend away from the threaded collar 27.

Exactly the same structure is provided, all elements being reversed, to constitute the second articulating means 48 of which one of the connecting spans is illustrated at the top in FIG. 1. It is not necessary to identify all of the elements and parts again, as they are exactly identical with those just described in connection with the first articulating means 46. The second articulating means ties the collar 26 to the second annular ring member 40.

It will now be appreciated that the construction just described ensures that the spacing between the first pipe end 17 and the second annular ring member 40 will always remain substantially constant, and that the spacing between the second pipe end 20 and the first annular ring member 34 will also remain substantially constant. This spacing would shrink slightly, of course, upon articulation of the connecting links during rotation of one pipe end.

It will be understood that the annular ring members 34 and 40 may be sized to exactly compensate for the expansive forces tending to urge the one pipe end away from the other. In effect, the hydraulic or pneumatic pressure of fluid within the pipe ends 17 and 20 urge the two annular ring members 34 and 40 away from each other, but this separative force is then communicated to the opposite pipe end in such a way as to tend to draw the pipe ends together. Proper sizing of the different elements will, of course, result in a precise compensation, a slight residual expansion tendency, or a slight residual contraction tendency, depending upon what is desired.

Figure 3:
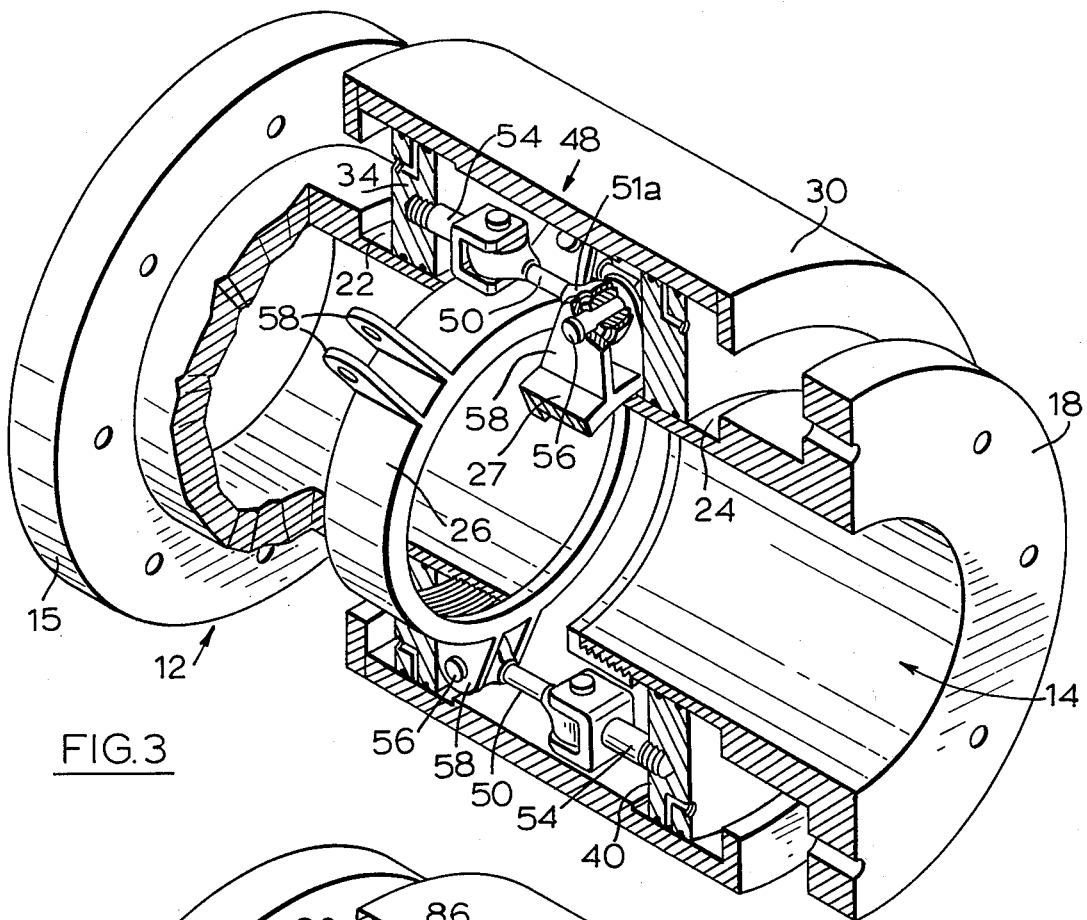
FIG. 3 is a partly broken away perspective view of the first embodiment of this invention.

As can be seen in FIG. 1, O-ring seals are provided in the first and second annular ring members 34 and 40 at the inner and outer cylindrical sealing surfaces of each. The O-rings are identified by the numeral 60. It will be appreciated that two O-rings could be used in "series" at the locations where single O-rings are shown, for the purpose of pressure sensing and/or grease lubrication/sealing. This is shown in FIG. 3.

It will now be seen that the first embodiment of this invention, as illustrated in FIG. 1, is adapted to permit both axial and radial (rotational) movement of one of the pipe ends with respect to the other. The capacity to absorb axial movement arises from the fact that both of the annular ring members 34 and 40 are slidable with respect to the respective pipe end and the sleeve member 30. The capability of permitting a certain degree of relative rotation of the one pipe end with respect to the other can arise either from the rotational sliding of either annular ring member with respect to the surfaces against which it seals, or from the angulation and articulation of the respective connecting links forming part of the articulating means described above (or both).

Figure 2:
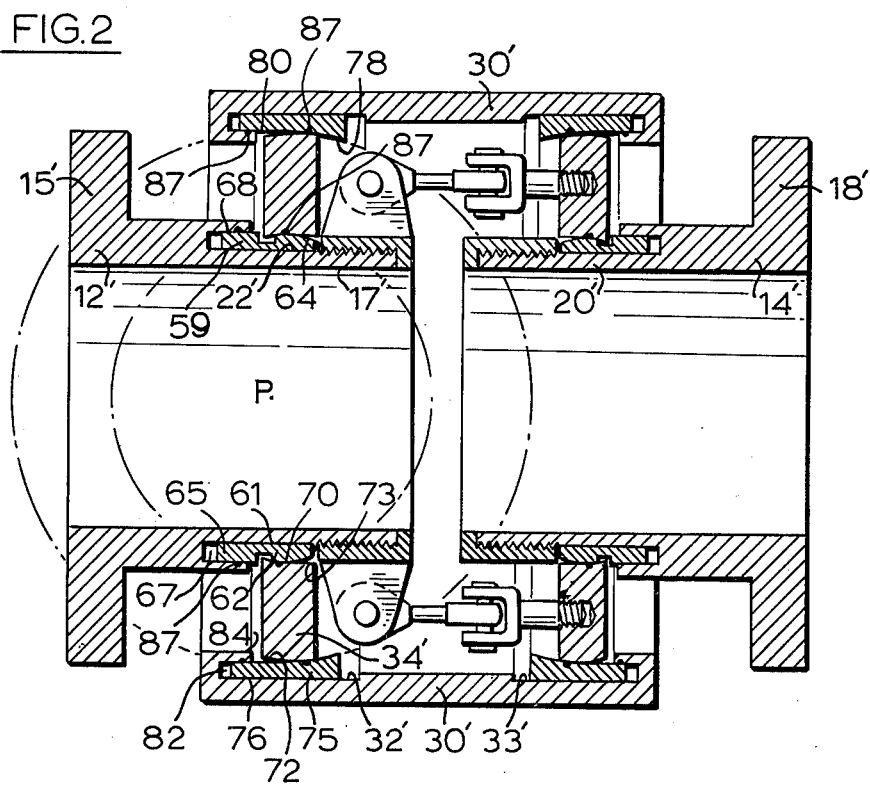
FIG. 2 is an axial sectional view of the second embodiment of this invention.

Attention is now directed to FIG. 2, in which the second embodiment of this invention is illustrated. The second embodiment of this invention is adapted to permit not only axial and rotational movement of one pipe end with respect to the other, but also an angular bending (articulation) of one pipe end with respect to the other. Thus, the second embodiment of this invention has the additional facility for permitting the of one pipe end to move through an angle with respect to the axis of the other pipe end.

In FIG. 2, the portions which have structure analogous to like portions in the embodiment of FIG. 1 are identified with the same numeral as appears in FIG. 1, distinguished by the prime.

In FIG. 2, a first flange member 12' and second flange member 14' are illustrated. These are provided with flanges 15' and 18', respectively. The first flange member 12' and the second flange member 14' define at their inner ends a first pipe end 17' and a second pipe end 20', respectively.

The leftward portion of the structure of FIG. 2 will now be described in detail, it being understood that the rightward portion is identical but reversed.

The inner end 17' of the first flange member 12' defines an outer cylindrical sealing surface 22', which is adapted to receive, in sealing relationship, an inner collar member 60. The inner collar member 60 has an inward cylindrical surface 61 which mates with the surface 22' in sliding relationship. The inner collar member 60 consists essentially of two portions, a first portion 62 which defines a spherical seat 64, and a second portion 65 which is adapted to be received slidingly and sealingly within an annular recess 67 defined between the surface 22' and an annular ledge portion 68. The spherical seat 64 has its center at the point marked by the letter p in FIG. 2.

It will be understood that the inner collar member 60 is adapted to slide in the axial direction with respect to the first flange member 12', and that the second portion 65 thereof is in sealing relationship with the annular recess 67.

In the structure of FIG. 2, a first annular ring member 34' can be seen to define an inner spherical sealing surface 70 and an outer spherical sealing surface 72. The outer spherical sealing surface 72 is concentric with the inner spherical sealing surface 70 and both, in the assembled condition, are concentric about the point P in FIG. 2. The concentricity of both outer and inner spherical surfaces is preferred but not essential for angulation. Thus, the centres of curvature of the inner and outer surfaces could be displaced from each other along the axis of the ring member. As can be seen, the inner spherical sealing surface 70 is spherical over only one-half of its extent, and is cylindrical over the remainder as can be seen at 73. The cylindrical portion 73 of the surface is provided in order to permit assembly. Ideally, of course, the entire surface at the inside of the first annular ring member 34' would be spherical, and in complete surface-to-surface engagement with the first portion 62 of the inner collar member 60.

The second embodiment of this invention includes a sleeve member 30' which defines two inner cylindrical sealing surfaces 32' and 33', as shown. Continuing with our particular description of the left-hand side of the structure of FIG. 2, there is provided an outer collar member 75 which defines an outward cylindrical sliding surface 76 which engages in sliding relationship with the inner cylindrical sealing surface 32'. The outer collar member 75 also defines a concave spherical sealing surface 78 which, when assembled, mates with the outer spherical sealing surface 72 of the annular ring member 34'. As can be seen, the inner surface of the outer collar member 75 is spherical over only a portion of its extent and is cylindrical as seen at 80 over its left half. The cylindrical nature of the left half of the outer collar member 75 permits assembly and also provides a portion receivable in an annular recess 82 defined in part by an annular ledge portion 84 at the extremity of the sleeve member 30'.

It will thus be realized that the outer collar member 75 is slidable axially with respect to the sleeve member 30', and is slidable in a spherical sense with respect to the annular ring member 34'.

Figure 4:
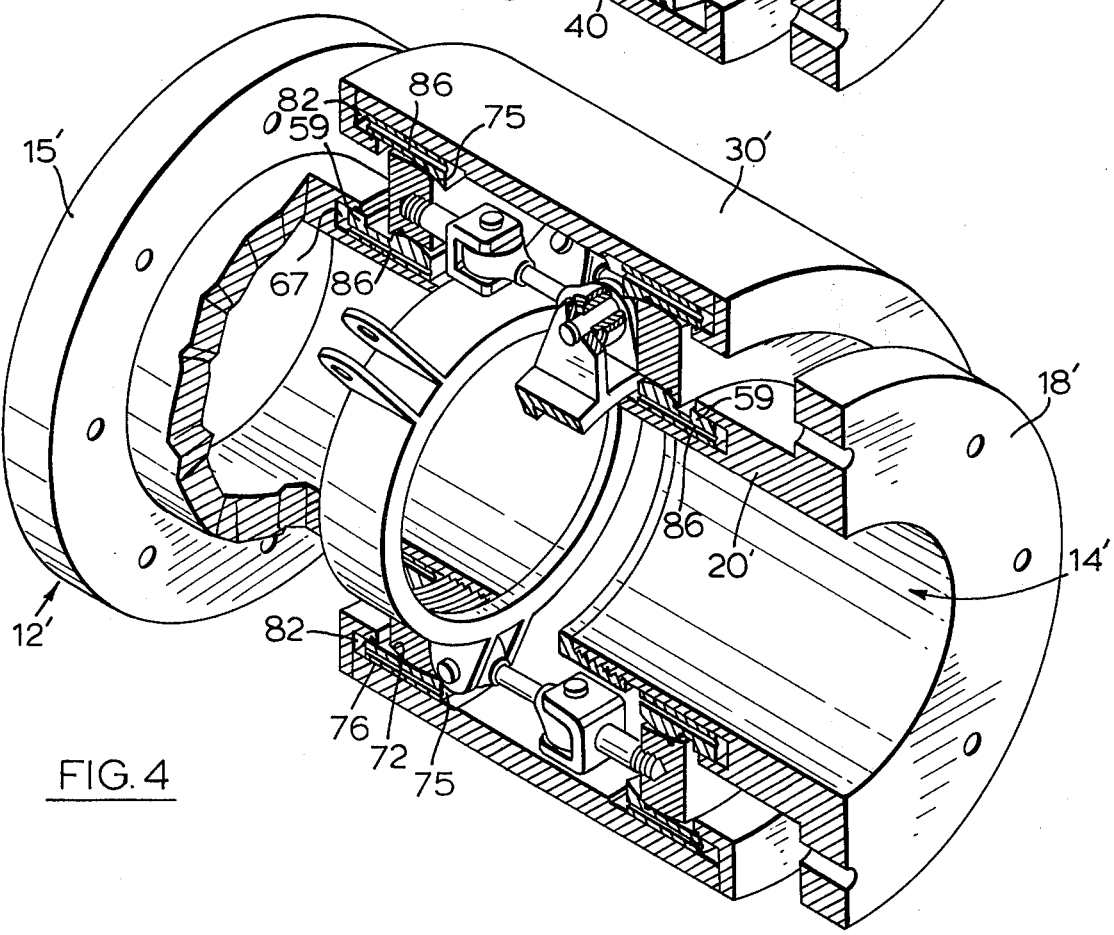
FIG. 4 is a partly broken away perspective view of the second embodiment of this invention.

Both the inner and the outer collar members 60 and 75 have passageway means by which the liquid or fluid pressure inside the pipe (which also means the portion to the right of the annular ring member 34' in FIG. 2) is communicated into the annular recesses 67 and 82, respectively. The passageway means is not illustrated in FIG. 2, but can be seen in FIG. 4 to include a plurality of bores 86 which are situated in the axial direction.

It is not considered necessary to repeat the discription of the articulating means shown generally by the arrows 46 and 48 in FIG. 1, as these means are identical in the second embodiment. Moreover, as previously stated, the right-hand portion of the structure of FIG. 2 is identical with the left-hand portion, but is reversed therefrom.

Suitable O-rings are provided where shown by the numeral 87.

It will be readily understood that the embodiment of FIG. 2 is adapted to permit rotational motion, axial motion and articulating movement of the one pipe end with respect to the other. The axial sliding movement is permitted by virtue of the ability of the inner and outer collar members to slide with respect to the flange member and the collar member. The radial or rotational movement is permitted by virtue of the fact that the spherical and cylindrical surfaces all permit slippage in a rotational sense, and also by virtue of the articulation of the articulating means tying each annular ring member to the opposite pipe end. The articulation or axial bending of the one pipe end with respect to the other is permitted by virtue of the spherical sealing surfaces.

In the operation of the FIG. 2 structure in the articulating sense, it will be understood that when the one pipe end bends with respect to the other (i.e. when the axis of the one pipe end swings through an angle with respect to the axis of the other), each of the annular ring members remains in a plane (a transverse plane) which is substantially normal to the axis of the opposite pipe end. To be more specific, when the second flange member 14' in FIG. 2 bends in the clockwise sense as pictured, the first annular ring member 34' will also swing in the clockwise sense, because it is tied to the inner end of the second flange member 14'.

In the FIG. 2 embodiment, the connecting link spans illustrated are both such as to tie the first flange member 12' to the second of the annular ring members. The other articulating means has not been illustrated in FIG. 2, but it is to be understood that the same would be identical to those illustrated in FIG. 2, but reversed. The non-illustrated articulating means would be located at alternate positions radially around the structure.

It will also be appreciated that, in addition to permitting the several described modes of movement of one flange member with respect to the other, the particular dimensions of the different parts can be selected in such a way as to permit exact or partial pressure compensation for the pipe coupling.

Figure 5:
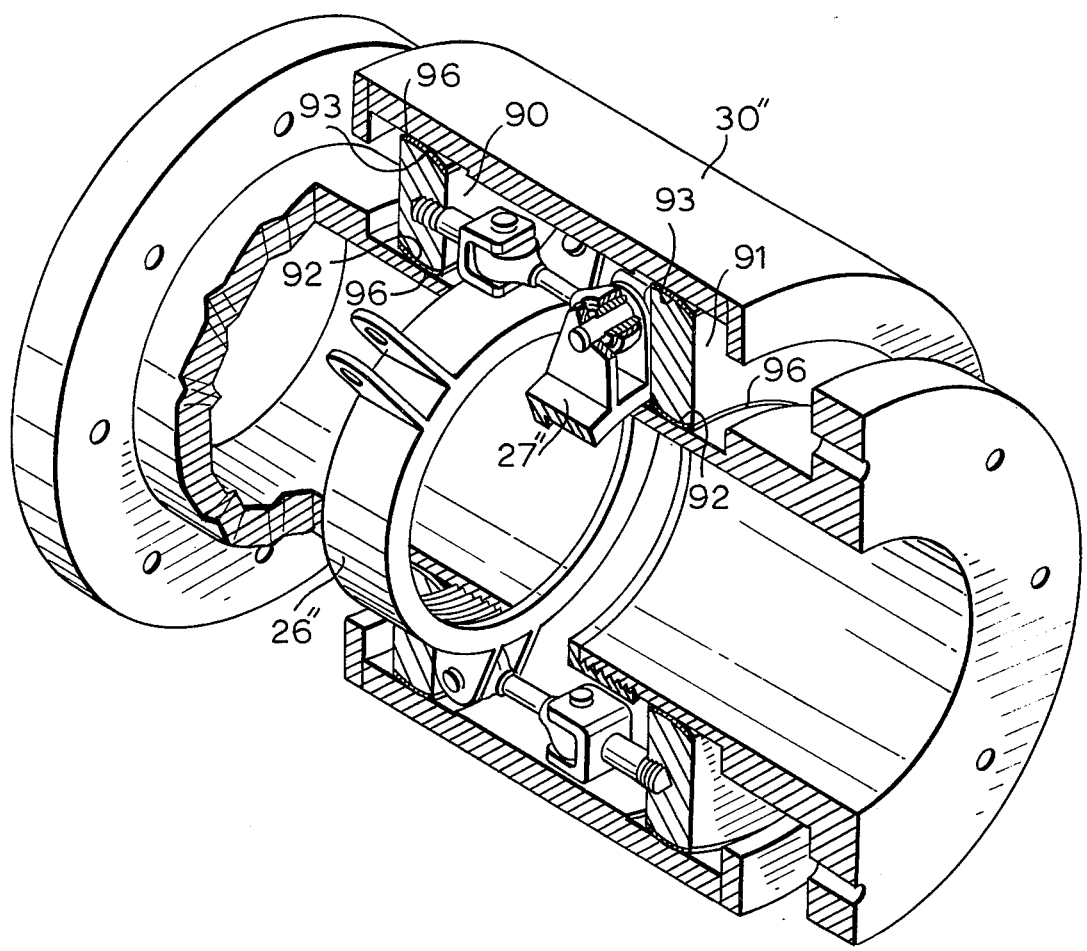
FIG. 5 is a partly broken away perspective view of the third embodiment of this invention.

Attention is now directed to FIG. 5, which illustrates the third embodiment of this invenion.

The structure of FIG. 5 is similar to that of the first embodiment of this invention, with the sole exception of the two annular ring members 90 and 91. Because the remaining portions of the structure of FIG. 5 are substantially identical to the corresponding portions in FIG. 1, no detailed description thereof need be given.

With regard to the annular ring members 90 and 91, however, it will be seen that these two members differ from the corresponding annular ring members 34 and 40 in FIG. 1 by virtue of the fact that the members 90 and 91 have convexly curved inner and outer surfaces 92 and 93, respectively. The corresponding surfaces of both members 90 and 91 have been identified with the same numeral. The profile of the section of the surfaces 92 and 93 may be circular or eliptical. To permit suitable sealing between the annular ring members 90, 91 and the corresponding cylindrical surfaces of the portions lying adjacent the annular ring members on the inside and on the outside, each of the surfaces 92 and 93 is provided with an elastomeric seal material which is bonded to the material of the annular ring members. The elastomeric seal material is provided, therefore, in the form of a layer 96 of small thickness compared with the annular ring members 90 and 91. Because of the elastomeric nature of the layers 96 of seal material, the construction of FIG. 5 permits an adequate seal of the contained fluid, and permits a limited amount of angular movement of the one flange with respect to the other. During angulation of the joint, the surface pressure which "pinches" or "squeezes" the layer 96 of elastomeric material will vary around the different locations of the contact, but it is contemplated that the thickness of the layers 96 will be sufficient to allow for a variation of the squeezing pressure, while still providing total containment of the fluid under pressure at all locations.

Naturally, the structure of FIG. 5 also permits rotational movement and axial movement of the one pipe end with respect to the other, by virtue of the same sliding principles as were discussed in connection with FIG. 1.

If desired, the seal effected by the layers 96 may be further enhanced by the provision of light guage cylindrical bellows extending between the annular ring members 90 and 91 immediately inwardly adjacent the outer sleeve member 30", and also extending between the inner inside wall of each of the annular ring members 90 and 91 and the corresponding inwardly adjacent threaded collar 25" or 27". The space between the bellows and the corresponding seals (i.e. on the other side of the bellows from the liquid or gas within the pipe joint) may be filled with a lubricating fluid or grease, maintained at the same pressure as the contained fluid or liquid in the pipe joint. This may be done by way of an accumulator or cylinder.

It will be appreciated that the bellows concept just described in connection with FIG. 5 is applicable to all of the arrangements and embodiments disclosed in this application, and that its primary effect is to permit the fluid or gas in the pipe system to be kept away from direct contact with the seals. Siince the oil or grease on the other side of the bellows is maintained at the same pressure as the liquid or gas in the pipe system, the seals still function as such.

I claim:

1. A pipe joint comprising: a first pipe end and a second pipe end juxtaposed in substantial alignment, each pipe end defining an outer sealing surface, a sleeve member spanning between and externally of both pipe ends and defining two inner sealing surfaces laterally aligned with the outer sealing surfaces of the pipe ends, a first annular ring structure having an inner sealing surface for sliding engagement with the outer sealing surface of said first pipe end, and having an outer sealing surface for sliding engagement with one of the inner sealing surfaces on said sleeve member, a second annular ring structure having an inner sealing surface for sliding engagement with the outer sealing surface of said second pipe end, and having an outer sealing surface for sliding engagement with the other of the inner sealing surfaces on said sleeve member, first articulating means connecting said first annular ring structure to said second pipe end, and second articulating means connecting said second annular ring structure to said first pipe end.

2. The invention claimed in claim 1, in which each said structure is a single integral ring of which the sealing surfaces are cylindrical and coaxial, and in which said articulating means permit rotational movement of one pipe end with respect to the other about their common axis.

3. The invention claimed in claim 2, in which both said articulating means include a plurality of connecting spans, each span including a connecting link having spherical rod ends at both ends.

4. The invention claimed in claim 1, in which each annular ring structure includes an annular ring with spherical inner and outer sealing surfaces, each inner and each outer spherical surface being in engagement with a respective collar member having a spherical surface in mating engagement with the respective spherical surface of the annular ring, each collar member also having a cylindrical sealing surface constituting one of the said sealing surfaces of the respective annular ring structure.

5. The invention claimed in claim 4, in which said articulating means are such as to permit rotational and articulating movement of one pipe end with respect to the other.

6. The invention claimed in claim 5, in which both said articulating means include a plurality of connecting spans, each span including a connecting link having spherical rod ends at both ends.

7. The invention claimed in claim 1, in which each said structure is a single integral ring of which both sealing surfaces are convexly curved when sectioned in a plane containing the ring axis, each said sealing surface having a layer of elastomeric sealing material bonded thereto, the sealing surfaces of said sleeve member being cylindrical, the outer sealing surfaces of both pipe ends being cylindrical.

* * * * *